G. STACKPOLE.
Shoe and Glove Buttoners.
No. 6,523. Reissued June 29, 1875.
*Fig. 1* *Fig. 2* *Fig. 3*
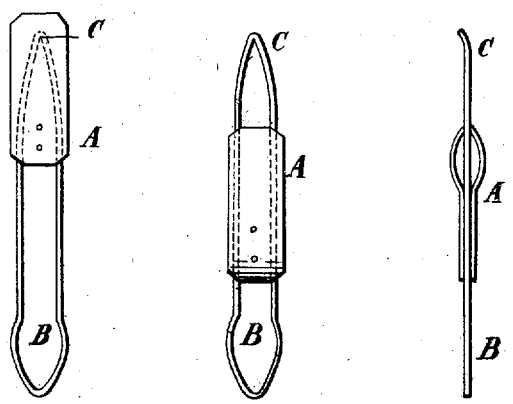
*Witnesses:*
A. Van Geson
L. G. Gunderson
*Inventor:*
G. Stackpole By
Amos Broadway Atty.
N. PETERS, PHOTO-LITHOGRAPHER, WASHINGTON, D. C.

UNITED STATES PATENT OFFICE.

GREENLEAF STACKPOLE, OF ELIZABETH, NEW JERSEY, ASSIGNOR TO GEORGIANNA D. COLLARD.

IMPROVEMENT IN SHOE AND GLOVE BUTTONERS.

Specification forming part of Letters Patent No. 161,548, dated March 30, 1875; reissue No. 6,523, dated June 29, 1875; application filed May 26, 1875.

*To all whom it may concern:*

Be it known that I, GREENLEAF STACKPOLE, of the city of Elizabeth, in Union county and State of New Jersey, have invented certain new and useful Improvements in Buttoners, which may also be used as an ear-spoon or as tweezers; and I do hereby declare the following to be a full, clear, and exact description of the same, reference being had to the annexed drawing, making part of this specification, in which—

Figures 1, 2, and 3 show different views of the invention.

My invention consists of a buttoner fitted with a sliding handle to strengthen it—the handle to be arranged to move from the center toward either end of the buttoner, which may have a large and a small hook or loop on its respective ends to serve in buttoning either gloves or shoes, and one end of the buttoner can be used as an ear-spoon, while at the same time the handle may be made in the form of a tweezer, as shown in Fig. 3 of the drawing. The buttoner consists of two parts, the handle and the hook. The latter may be made of wire bent, pressed, or cut in the form shown by B C, the end B being for shoes or large buttons, and the end C for gloves or small buttons, as shown by the drawing. The handle may be made of two pieces of plain wood or metal, or other suitable material, riveted together, and arranged to slide on the hook to fill the function of a sliding handle or clasp, merely to strengthen the hook in addition to its office as a handle; or, if made of metal, one end may be in the form of a tweezer, which still further adds to the utility of the implement. Fig. 3 shows the handle in the form of tweezers. Fig. 1 shows the handle shoved over the small end of the hook or loop, and Fig. 2 shows it shoved toward the large head or loop.

It will be seen that a large and small buttoner are here united in one implement, which is fitted with a shifting handle to strengthen it, and which handle may be made in the form of tweezers.

I claim and desire to secure by Letters Patent—

A double-end buttoner fitted with a sliding handle, substantially as described, for the purpose specified.

G. STACKPOLE.

Witnesses:
AMOS BROADNAX,
BRICE COLLARD.